May 31, 1938.  H. B. RUSSELL  2,119,180
ROTARY TIRE PUMP FOR MOTOR VEHICLES
Filed June 9, 1937   4 Sheets-Sheet 1
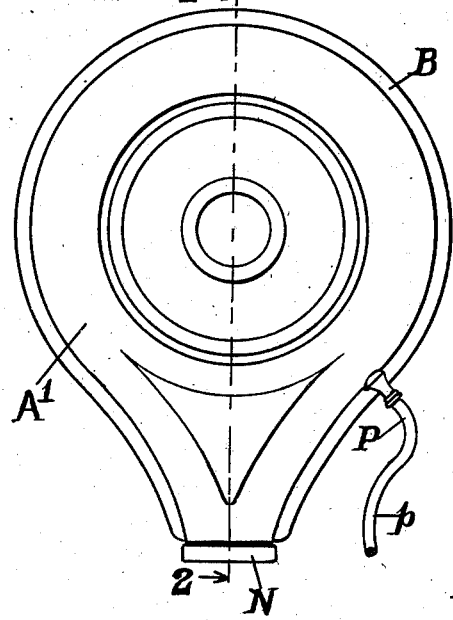
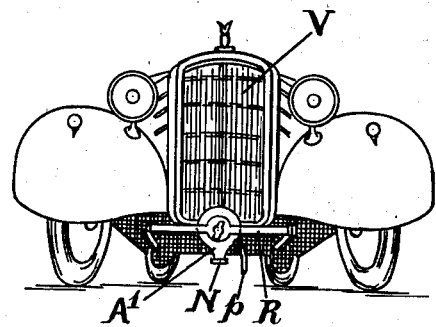
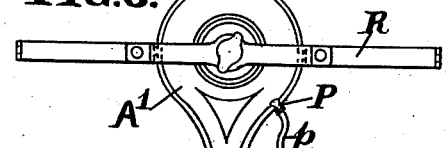
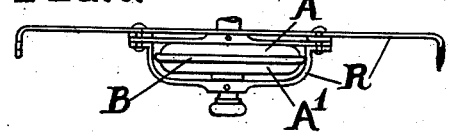
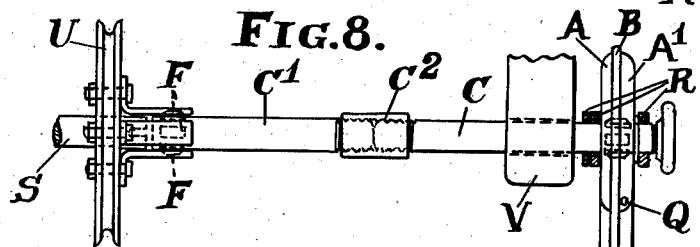
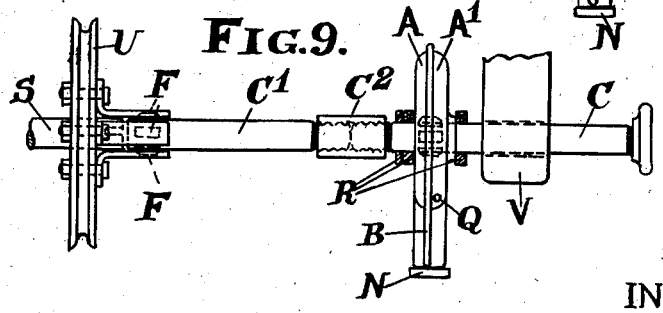
INVENTOR.
Harry Briggs Russell
By Eugene E. Stevens
Atty.

May 31, 1938. H. B. RUSSELL 2,119,180
ROTARY TIRE PUMP FOR MOTOR VEHICLES
Filed June 9, 1937 4 Sheets-Sheet 2

INVENTOR.
Harry Briggs Russell
By Eugene E. Stevens
Atty.

Patented May 31, 1938

2,119,180

UNITED STATES PATENT OFFICE 2,119,180

ROTARY TIRE PUMP FOR MOTOR VEHICLES

Harry Briggs Russell, Morecambe and Heysham, England

Application June 9, 1937, Serial No. 147,317
In Great Britain April 2, 1937

2 Claims. (Cl. 230—149)

This invention relates to a rotary tire pump for motor vehicles that is adapted to be detachably or permanently secured in position on a driving shaft and to be coupled by a flexible air tube to the tires to be inflated. The aforesaid driving shaft may be detachably connected to the engine or cranking shaft in a similar manner to the starter handle and the pump may be mounted on the driving shaft outside the radiator or between the radiator and the end of the cranking shaft.

The pump comprises a casing containing a rotary member adapted to be detachably secured to a driving shaft and carrying a piston that fits an annular tubular portion of the casing, a plate slidably mounted in a valve chamber and normally projected across the tubular portion of the casing by a spring forming an air trap between which and the piston air is compressed and delivered to the tire through a delivery outlet in the casing near one side of the plate and means actuated by the piston to withdraw the plate from the tubular portion to allow the piston to travel past same whereupon the spring restores the plate to its closing position, and the piston during its rotation draws air into the casing through an aperture near the other side of the plate.

In the accompanying drawings:—

Fig. 1 is a front view of the pump.

Fig. 5 is a front view of a motor car showing the pump fitted in front of the radiator.

Fig. 6 is a detached view of a pump and a bracket for supporting same drawn to a larger scale.

Fig. 7 is a plan of the parts shown in Fig. 6.

Fig. 8 is a view showing the pump mounted in front of a radiator on a driving rod made in two parts detachably coupled to the engine or cranking shaft.

Fig. 9 is a similar view to Fig. 4 showing the pump situated behind the radiator.

Figure 2:
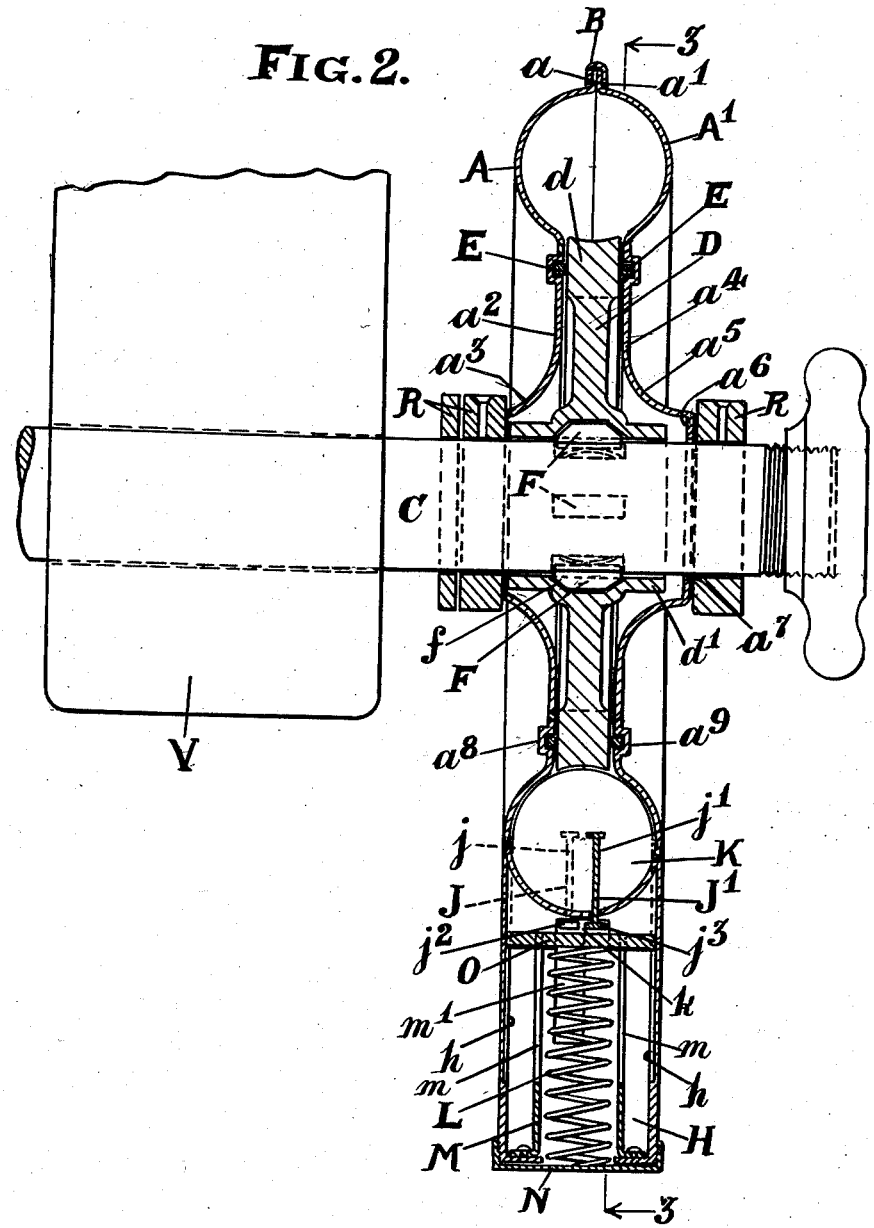
Fig. 2 is an enlarged section taken on line 2—2 of Fig. 1.
Figure 3:
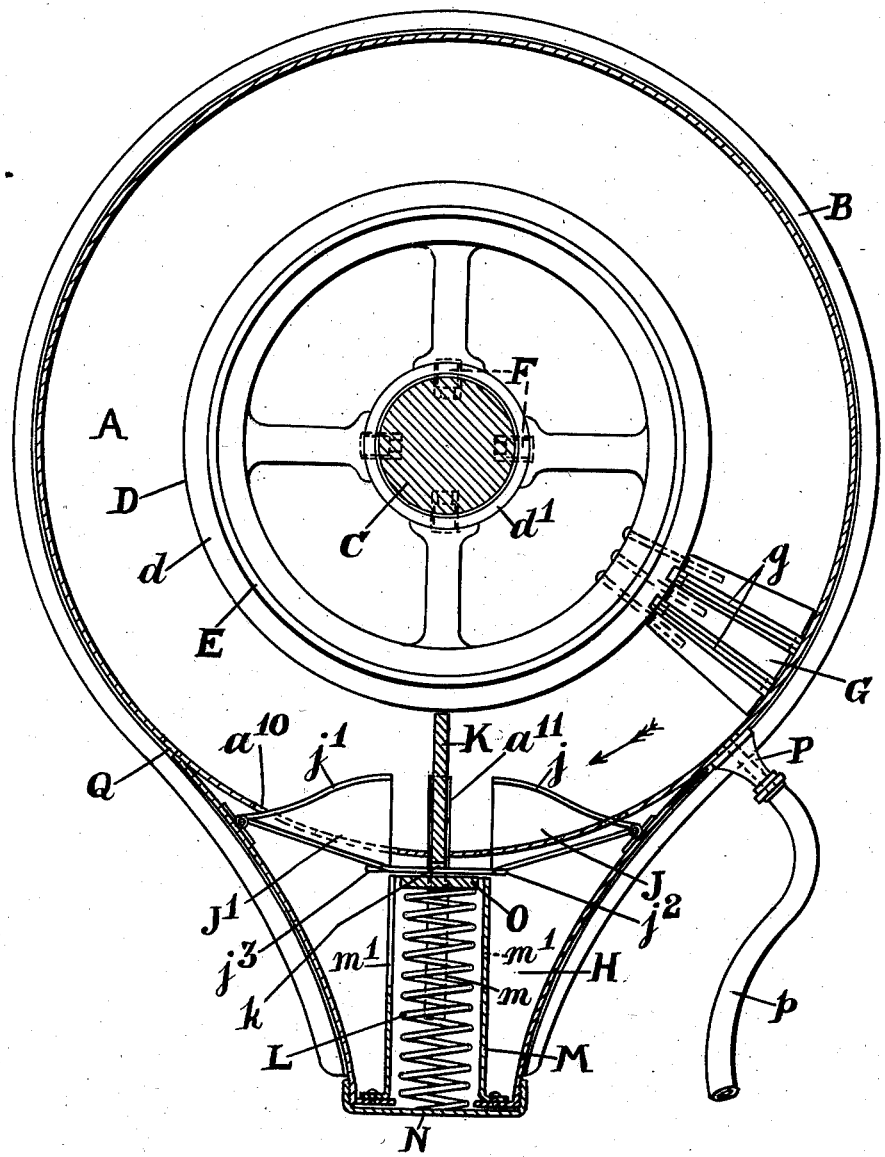
Fig. 3 is a section taken on line 3—3 of Fig. 2, showing the piston about to pass the air delivery pipe.
Figure 4:
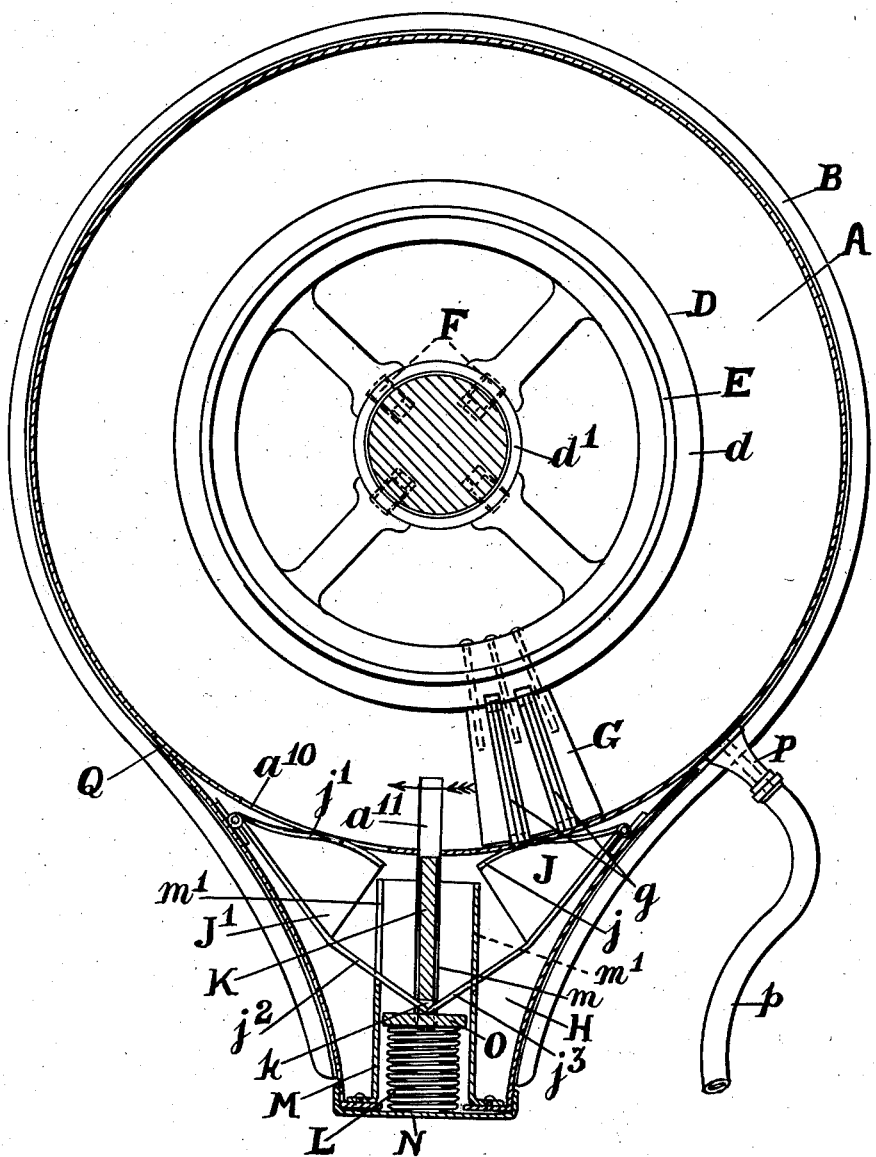
Fig. 4 is a similar view to Fig. 3 showing the position of certain parts moved by the piston after passing the delivery pipe.

The pump comprises a casing made in two parts A, A$^1$ each of which is formed with a flange $a$, $a^1$ which are fixed together by a channel shaped binding member B which may be secured by clamping or rolling or be otherwise fixed in position. Each of the parts A, A$^1$ is formed with an annular channel so that when the two parts are fixed together they form an annular tube that is circular in cross section. Extending inwardly from the part A$^1$ is a disc-like portion $a^2$ that is flared outwardly at $a^3$ and formed with a central aperture for the passage of a driving rod C. The other part A$^1$ is in like manner extended inwardly at $a^4$ and flared outwardly at $a^5$ and flanged inwardly at $a^6$ and formed with a hole $a^7$ for the passage of the driving rod C. Interposed between the two parts $a^2$ and $a^4$ is a wheel or rotary member D formed with a rim $d$ between which and the two parts $a^2$, $a^4$ a tight joint is made by means of two concentrically arranged air locking rings E which may be made of metal or other suitable material. These rings are retained in position by being let into annular channels $a^8$, $a^9$ in the parts $a^2$, $a^4$. The inner part of the wheel or rotary member is formed with a hub $d^1$ that is connected with the driving rod C by spring pressed keys F adapted to be pressed inwardly by endwise movement of the rotary member D on the driving rod C when pressed into position thereon or removed when required. Attached to the rim of the rotary member D is a piston G that fits within the tubular portion of the casing and is provided with one or more rings $g$ for making a tight joint with the casing. Extending from a portion of the latter is a valve chamber H in which are hinged two arms J, J$^1$ each of which is formed with a hump or cam surface $j$, $j^1$ that is adapted to pass through an opening $a^{10}$ formed on the parts A, A$^1$ of the casing. The arms J, J$^1$ are formed with extensions $j^2$, $j^3$ which are passed through a hole $k$ in a plate K that is slidably mounted in grooves $h$ in the valve chamber H. This plate is adapted to be projected through a hole $a^{11}$ in the parts A, A$^1$ of the casing by means of a spring L that is situated within a tube M and maintained in a state of compression between a cap N on the bottom of the valve chamber H and a plate O. This plate may be fixed to the plate K and it is capable of sliding in slots $m$ in the tube M. The extensions $j^2$ and $j^3$ also pass through slots $m^1$ in the tube M. Formed in one or other of the parts A or A$^1$ is a delivery outlet P that is adapted to be connected by a flexible pipe $p$ with the valve of the tire to be inflated and also formed in one or other of the parts A, A$^1$ is an air inlet Q. The plate K and arms J, J$^1$ normally occupy the position shown in Fig. 3 in which position the plate K constitutes an air trap. When the pump is in action, as the piston G travels round the annular portion from one side of the air trap $k$ to the other the air that is in front of it becomes compressed between the piston and the trap and forced through the delivery outlet P and flexible tube $p$ to the tire to be inflated. When the piston travels over the hump or cam surface $j$ it depresses the latter together with the air trap and the other cam portion $j^1$ to the position shown in Fig. 4 thereby forming a clear passage for the piston as it travels past them. As soon as the piston has travelled past the cam surface $j^1$ the spring L returns the aforesaid parts to their normal position and the piston compresses the air in the tubular casing as it travels round the latter towards the delivery outlet. After the piston has travelled past the air inlet Q it draws air in behind it and compresses the air between the front of it and the trap in the manner previously described.

In the construction shown in Figs. 5 to 7 the pump is attached to a supporting member R by which it can be fixed to the front portion of the chassis.

In the construction shown in Fig. 8 the pump is mounted on a driving rod that is made in two portions C, $C^1$ connected together by a screw coupling $C^2$ the portion $C^1$ being connected with a power driven shaft S by spring keys such as F fitted in angle brackets T fixed to a pulley U from which the drive may be transmitted to the fan or dynamo or both. In the construction shown in Fig. 8 the pump is situated behind it. Instead of the pump being mounted and driven in the manner described it can be mounted in any other suitable position on the engine or vehicle and driven by a flexible driven shaft or by an electric motor which may be mounted on the vehicle or independently thereof.

What I claim as my invention and desire to secure by Letters Patent in the United States is:—

1. A rotary air pump comprising a circular casing made in two parts each of which is formed with an outer portion that is approximately semicircular in cross section and has extending inwardly therefrom a disc-like portion that is flared outwardly towards the center and is formed with a central aperture, a rotary member that is interposed between the two parts and is formed with a rim the peripheral portion of which together with the aforesaid semicircular portions completes an annular tube that is circular in cross section, means for making a fluid tight joint between the rim and disc portions, a piston attached to the rim and occupying a position within the annular tube, a chamber situated outside the annular tube and connected therewith, a guide situated within said chamber, a valve plate slidably mounted in said guide and adapted to pass through a slot in the annular chamber and form an air trap, a spring for projecting the plate through the slot, two arms pivoted within the chamber at opposite sides of the plate and formed with cam surfaces for displacement by the piston, the free ends of the arms passing through an opening in the plate, an air-outlet situated in the annular chamber in proximity to the pivot of one arm, an air inlet situated in the annular chamber in proximity to the pivot of the other arm, and coupling means for connecting the rotary member with a driven shaft.

2. The structure of claim 1, and additionally comprising a radiator having an opening therein, a driven shaft arranged to pass through said opening, said rotary member being detachably coupled to the driven shaft, a driving shaft, and means for coupling either end of the driven shaft to the driving shaft so that the pump can occupy a position in front of the radiator or between the latter and the driving shaft.

HARRY BRIGGS RUSSELL.